May 30, 1939.  H. W. PRICE ET AL  2,160,084

CLUTCH CONTROL MECHANISM

Filed Jan. 5, 1934

INVENTOR.
HAROLD W. PRICE
EARL R. PRICE
BY H. O. Clayton
ATTORNEY

Patented May 30, 1939

2,160,084

UNITED STATES PATENT OFFICE 2,160,084

CLUTCH CONTROL MECHANISM

Harold W. Price and Earl R. Price, South Bend, Ind., assignors to Bendix Aviation Corporation, South Bend, Ind., a corporation of Delaware Application January 5, 1934, Serial No. 705,410

11 Claims. (Cl. 192—.01)

This invention relates to clutch control devices for an automotive vehicle.

In certain prior art constructions there are disclosed means for manually disengaging the clutch in combination with automatically operable check means for controlling the engagement of the clutch; furthermore, there are provided clutch control mechanisms wherein the complete operation of the clutch is effected by a pressure differential operated motor.

The present invention in one of its aspects is directed to the combination of the above mechanisms in one compact unit providing a so-called clutch assistor, that is pressure differential operated means for aiding the physical effort of the driver in disengaging the clutch, said means also acting as a check means to completely control the engagement of the clutch.

Broadly stated therefore, it is an object of the invention to provide power means for partially effecting the disengagement of the clutch and completely controlling the engagement thereof.

A further object of the invention is to provide a pressure differential operated motor, assisting the driver to disengage the clutch and automatically operable to simulate a conventional manually controlled engagement of the clutch by providing a so-called two-stage engaging movement of the stator clutch element; by the latter is meant a relatively rapid movement of the clutch element up to the point where the clutch is just about to engage and thereafter a relatively slow cushioning movement of said element.

Yet another object of the invention is to provide a pressure differential operated motor for operating the clutch, said motor being controlled by a so-called dump valve, operable by the driver at closed throttle to effect a clutch disengaging operation of the motor and automatically operable, during a clutch engaging operation of the motor, to change the rate of clutch engagement when the clutch plates are about to engage, as explained above.

A further object of the invention is to provide a valve for controlling the operation of a pressure differential operated motor, said valve being manually operable to control the motor to effect a disengagement of the clutch and automatically operable to control the motor to effect an engagement of the clutch.

A further object of the invention relates to the provision of a pressure differential operated motor controlled by a so-called dump valve, the motor being completely energized to aid the physical effort of the driver in disengaging the clutch, the capacity loading effect of said motor however falling short of the total load necessary to maintain the clutch disengaged, said motor and its control valve further being so designed as to fully control the engagement of the clutch unaided by the driver.

The invention also contemplates a clutch operating motor energized by virtue of the manifold vacuum of the internal-combustion engine, said motor being controlled both as to its clutch disengaging and variable clutch engaging operations by a single valve means incorporated in the fluid transmitting connection between the motor and the manifold.

Yet another object of the invention is to provide a clutch operating motor controlled by valve mechanism operable, as the clutch plates are just at the point of separation, to energize the motor and thus assist in the disengagement of the clutch, said mechanism being further operable to so control the deenergization of the motor as to effect an engagement of the clutch simulating a manual operation thereof.

The invention also contemplates a pressure differential operated clutch operating motor controlled by valve means, completely manually operable to effect an energization of the motor to disengage the clutch, and partially manually operable and partially automatically operable to effect a deenergization of the motor to engage the clutch.

Yet another object of the invention is to provide power means for assisting the operator in disengaging the clutch, said means being operative to completely control the engagement of the clutch unaided by the operator.

A further object of the invention is to provide power means for controlling the operation of the clutch, the controlling valve for said means being operative as a function of the position of the driven element of the clutch, both in effecting the disengagement and the engagement of the clutch.

Other objects of the invention and desirable details of construction and combinations of parts will become apparent from a detailed description of certain embodiments of the invention, described in detail in the following specification taken in conjunction with the accompanying drawing illustrating said embodiments, in which.

Figure 1:
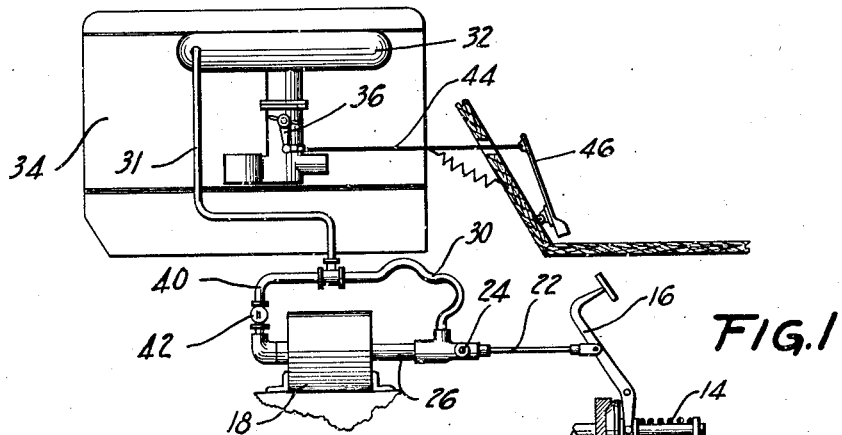
Figure 1 is a diagrammatic view of the clutch control mechanism constituting the present invention.
Figures 2, 2A:
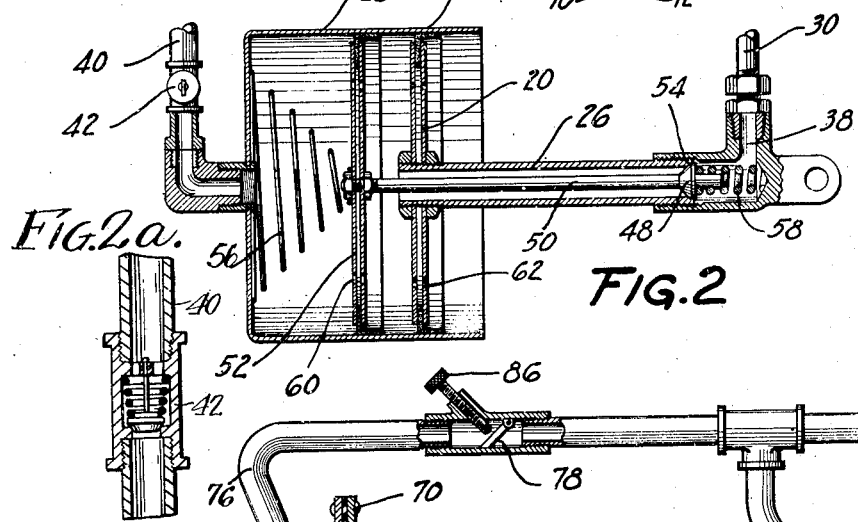
Figure 2 is a longitudinal sectional view taken through the clutch operating pressure differential motor disclosed in Figure 1.
Figure 2a is a sectional view disclosing the details of the check valve of Figure 2.

In that embodiment of the invention disclosed in Figures 1 and 2 a conventional clutch, comprising driven and driving clutch plate elements 12 and 10, respectively, and a conventional clutch spring 14, is adapted to be successively rendered inoperative and operative under the joint control of a conventional manually operated clutch pedal 16 and a pressure differential operated motor 18.

The clutch pedal is connected to a piston 20 of the clutch motor by a connection comprising a link 22, pivotally connected at 24 to a tubular member 26, the latter being threaded at one end to receive the piston, constituting the power element of the clutch motor. The stationary element of the motor comprises an open-ended cylinder 28 fixedly mounted to some convenient part of the chassis, not shown. Flexible conduits 30 and 31 serve to interconnect the intake manifold 32 of an internal-combustion engine 34, at a point in the manifold remote from a throttle 36, with a port 38 in the tube 26, and a conduit 40, having a check valve 42 therein, interconnects the conduit 31 with the closed end of the cylinder 28. The throttle 36 is arranged to be operated, through the intermediary of a link 44, by an accelerator pedal 46, as is the usual practice. A poppet valve member 48, having a stem 50 and guide piston 52, is adapted to seat at 54 in the tube 26 when a spring 56, interposed between the guide piston and one end wall of the cylinder 28, is collapsed by a depression of the clutch pedal, a spring 58 stronger than spring 56 being interposed in series between the end of the tube 26 and the valve 48. The relative strengths of the clutch springs 14 and the springs 56 and 58 are so calibrated that the valve 48 is unseated to open up connection between the manifold and cylinder 28, just as the driving and driven elements of the clutch are about to be disengaged. Thus the valve is unseated when the clutch plates are just out of contact and is seated just before the clutch elements come into contact. Both springs 56 and 58 may be adjusted as to their tension by adjusting the lengths of the tube 26 and the rod 50, thus providing means for timing the operation of the valve 48. The guide piston 52 is ported at 60 to permit the air within the cylinder to circulate freely between both sides of the piston, and the motor piston 20 is provided with a plurality of small ports or vents 62 of such size as to effect the desired influx of air to the cylinder to cushion the engagement of the clutch.

Describing now the operation of the clutch controlling mechanism, upon depression of the clutch pedal by the driver the valve 48 is unseated when the clutch plates are just at the disengaging point, whereupon the cylinder 28 is connected with the manifold. The throttle is at this time closed as a preliminary operation to disengage the clutch, thus creating a vacuum within the manifold to evacuate the cylinder 28 and impose a load upon the clutch pedal in addition to the then existing physical load imposed by the driver. The specifications of the cylinder, its connection with the clutch pedal and remaining parts are, however, such that the total load imposed by the vacuum motor is of itself insufficient to disengage the clutch, that is the motor is said to be underrated: however, together with the physical effort of the driver, the clutch is disengaged, the motor materially aiding in such disengagement to thus lighten the work of the driver. It should be further noted that there is no follow-up action of the valve 48, the same being opened and remaining open to provide a so-called dump valve action.

When it is desired to engage the clutch, the driver completely releases his foot from the clutch pedal, whereupon the clutch springs immediately function to initiate the engagement of the clutch. The atmosphere is then drawn into the cylinder from the manifold at a rate depending upon the degree of throttle opening, controlling the degree of absolute pressure in the manifold, and depending upon the size and shape of the conduit 30, valve 48, ports 62 and other fixed dimension parts. The clutch is thus engaged relatively rapidly and at a rate varying only with the degree of manifold vacuum. This relatively rapid engaging movement of the clutch is terminated however, when the load on the spring 58 is reduced sufficiently to seat the valve 48, this occurring, as previously described, when the clutch plates are about to engage. Thereafter the rate of engagement of the clutch is solely a function of the rate of ingress of air to the cylinder via the ports 62, and such rate is made low enough to insure a smooth and cushioned engagement of the clutch. The check valve 42 is, of course, closed during the engagement of the clutch: however, the operation of the valve to open the conduit 40 serves to expedite the evacuation of the cylinder to air in disengaging the clutch.

Figure 3:
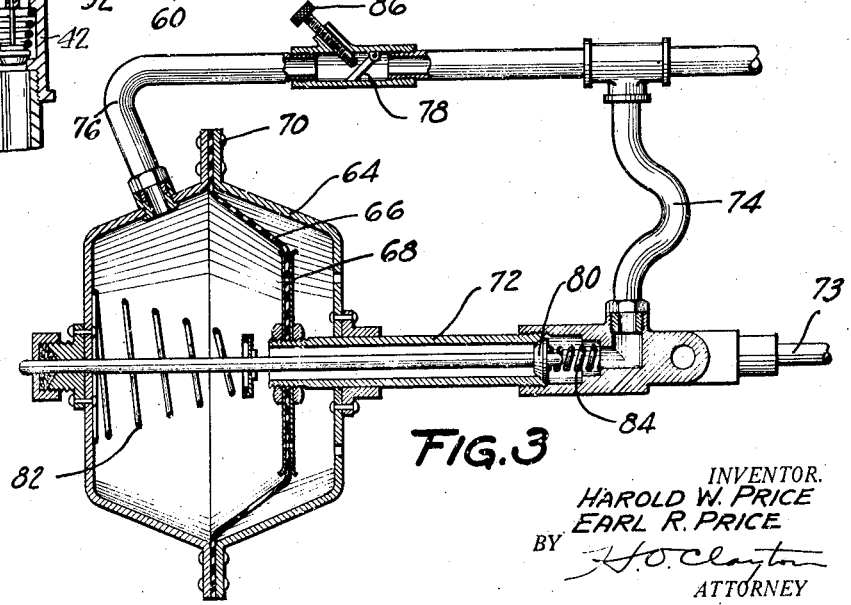
Figure 3 is a longitudinal sectional view disclosing an alternative form of pressure differential operated clutch operator.

There is disclosed in Figure 3 an alternative form of clutch motor, in the main similar in operation to the motor of Figure 2. A so-called diaphragm type of motor is employed in lieu of the cylinder and piston type of Figure 2, said motor comprising a casing 64 fixed to the chassis and a flexible diaphragm 66 ported at 68, secured to the casing at 70 and operably connected to a clutch pedal 16 by a tube 72 and link 73. The casing 64, tube 72 and manifold 32 are interconnected by conduits 74 and 76, an inwardly opening check valve 78 being incorporated in the conduit 76. A poppet valve 80 is incorporated in series with springs 82 and 84, such construction being similar to that of the mechanism of Figure 2. Tube 72, link 73 and the clutch springs are in series with said parts, the several springs being calibrated as previously described.

In operation, the device of Figure 3 functions as does that of Figure 2 with the exception that the rate of clutch engagement is at all times a function of the degree of throttle opening, inasmuch as after the valve 80 seats the atmosphere admitted to the casing 64 enters via the check valve 78 as well as ports 68, and not solely via the vents in the piston element of the motor as with the mechanism of Figure 2. The check valve may be adjusted, by stop 86, to vary the engagement as desired. The vents 68 in the diaphragm 66 supplement the check valve in admitting atmosphere to the casing 66. It should also be noted that the vents 68 in the diaphragm 66 and vents 62 in piston 20 provide a so-called vacuum leak while the clutch is disengaged. However, the plentiful supply of vacuum of the manifold is adequate to compensate for such leaks.

Although this invention has been described in connection with certain specific embodiments, the principles involved are susceptible of numerous other applications that will readily occur to persons skilled in the art. The invention is, therefore, to be limited only as indicated by the scope of the appended claims.

We claim:

1. Clutch control mechanism for an automotive vehicle provided with a clutch, manually operable means for operating the clutch, an intake manifold and a throttle, a clutch operating motor operably connected with the clutch to assist in the disengagement thereof, an unvented fluid transmitting connection interconnecting said motor and manifold, a two-way valve means incorporated in said connection, means interconnecting said valve and manually operable means, said valve being operative to control the clutch disengaging operation of said motor and in part to control the clutch engaging operation of said motor.

2. Clutch control mechanism for an automotive vehicle provided with a clutch, a throttle and an internal-combustion engine, a clutch operating pressure differential operated motor, an unvented fluid transmitting connection interconnecting said motor and manifold, and valve means for controlling the operation of the motor, said valve means comprising a valve member operable to successively connect and disconnect said motor and manifold, together with manually operable means for effecting one of the operations of said valve member.

3. In a clutch control mechanism for an automotive vehicle provided with a clutch, a fluid pressure motor operably connected with the clutch, valve means operative, in conjunction with the valve means hereinafter referred to, to energize the motor, and clutch controlled valve means operable to control the deenergization of the motor.

4. In a clutch control mechanism for an automotive vehicle provided with a clutch pedal, fluid pressure operated means operably connected with the pedal, valve means operative to in part control the energization of the fluid pressure means, and clutch pedal operated valve means operative in part to control the deenergization of the fluid pressure means.

5. In an automotive vehicle provided with a manifold and a clutch, a pressure differential operated motor operably connected to the clutch, fluid transmitting means interconnecting the manifold and motor, pressure differential operated valve means incorporated in said fluid transmitting means and operative at a relatively high manifold vacuum to in part control the energization of the motor, together with other valve means operable to control the deenergization of the motor.

6. In an automotive vehicle provided with a manifold and a clutch, a pressure differential operated motor operably connected to the clutch, fluid transmitting means interconnecting the manifold and motor, pressure differential operated valve means incorporated in said fluid transmitting means and operative at a relatively high manifold vacuum to in part control the energization of the motor, together with a manually operable valve means operable to control the deenergization of the motor.

7. In a clutch control mechanism for an automotive vehicle provided with a clutch, a pressure differential operated motor operably connected with the clutch, a power operated valve means operative to in part control the energization of the motor, and a manually operative valve means operative to the exclusion of the first-mentioned valve means to control the deenergization of the motor.

8. In a clutch control mechanism for an automotive vehicle provided with a clutch, a fluid pressure motor operably connected with the clutch to assist in disengaging the same, valve means for in part effecting the energization of the motor, and other valve means for so controlling the deenergization of the motor as to effect a relatively rapid first stage of clutch engagement.

9. In a clutch control mechanism for an automotive vehicle provided with a clutch pedal, a fluid pressure motor operably connected with the clutch to assist in disengaging the same, valve means for in part effecting the energization of the motor, and other valve means operable by the clutch pedal to so control the deenergization of the motor as to effect a relatively rapid first stage of clutch engagement.

10. In a clutch control mechanism for an automotive vehicle provided with a clutch pedal, a fluid pressure motor operatively connected with the clutch to assist in disengaging the same, valve means for in part effecting the energization of the motor, and a position controlled valve means operated by the clutch pedal and operative to so control the deenergization of the motor as to effect a relatively rapid first stage of clutch engaging movement.

11. In a clutch control mechanism for an automotive vehicle provided with a clutch and an intake manifold, a pressure differential operated motor operably connected with the clutch, fluid transmitting connections interconnecting said motor and manifold, valve means incorporated in said connections and operable, in conjunction with the hereinafter mentioned valve means, to interconnect said manifold and motor to partially evacuate and therefore energize the latter, and other valve means incorporated in said connections operative to control the connections to effect a controlled deenergization of the motor in accordance with the mode of change of gaseous pressure within the manifold.

HAROLD W. PRICE.
EARL R. PRICE.

CERTIFICATE OF CORRECTION.

Patent No. 2,160,084.                                         May 30, 1939.

HAROLD W. PRICE, ET AL.

It is hereby certified that error appears in the printed specification of the above numbered patent requiring correction as follows: Page 2, second column, line 36, for the word "air" read --aid--; and that the said Letters Patent should be read with this correction therein that the same may conform to the record of the case in the Patent Office.

Signed and sealed this 7th day of May, A. D. 1940.

(Seal)

Henry Van Arsdale,
Acting Commissioner of Patents.